United States Patent [19]

Lamb et al.

[11] 4,076,678

[45] Feb. 28, 1978

[54] PLASTICIZED POLYMERS OF VINYL ACETATE

[75] Inventors: Frank Lamb, Oldham; Malcolm Combey, Mellor; Hugh Melvin Cooper, Cheadle, all of England

[73] Assignee: Ciba-Geigy AG, Basel, Switzerland

[21] Appl. No.: 602,890

[22] Filed: Aug. 7, 1975

Related U.S. Application Data

[63] Continuation-in-part of Ser. No. 406,175, Oct. 12, 1973, abandoned, which is a continuation-in-part of Ser. No. 192,625, Oct. 26, 1971, abandoned.

[30] Foreign Application Priority Data

Oct. 27, 1970 United Kingdom ............... 50906/70

[51] Int. Cl.$^2$ .......................... C08K 5/11; C08K 5/12; C08L 3/04
[52] U.S. Cl. ............................... 260/31.6; 260/31.8 R
[58] Field of Search ........................ 260/31.6, 31.8 R

[56] References Cited

U.S. PATENT DOCUMENTS

| 3,091,597 | 5/1963 | Henriques | 260/31.6 |
| 3,149,087 | 9/1964 | Anagnostopoulos et al. | 260/31.6 |
| 3,250,738 | 5/1966 | Isaacs et al. | 260/31.6 |

FOREIGN PATENT DOCUMENTS

| 522,931 | 10/1953 | Belgium | 260/31.6 |
| 560,036 | 7/1958 | Canada | 260/31.6 |
| 734,115 | 7/1955 | United Kingdom | 260/31.6 |

OTHER PUBLICATIONS

Koroly et al., Industrial and Engineering Chemistry, vol. 45, No. 5, May, 1953, pp. 1060–1063.

Primary Examiner—Allan Lieberman
Attorney, Agent, or Firm—Wenderoth, Lind & Ponack

[57] ABSTRACT

Polyesters derived from the reaction of a dibasic acid, a polyethylene glycol and an aliphatic alcohol are used as plasticizers for vinyl acetate polymers.

9 Claims, No Drawings

PLASTICIZED POLYMERS OF VINYL ACETATE

This application is a Continuation-in-Part of copending application Ser. No. 406,175, filed Oct. 12, 1973, now abandoned which itself is a Continuation-in-Part of copending application Ser. No. 192,625, filed Oct. 26, 1971, now abandoned.

According to the present invention there is provided a composition comprising a vinyl acetate polymer or copolymer and from 10% to 100% by weight based on the weight of the polymer or a polyester having a molecular weight of from 350 to 1500 derived from the reaction of (i) a glycol selected from ethylene glycol, diethylene glycol or a polyethylene glycol having a molecular weight of up to 500
(ii) an aliphatic alcohol containing from 2 to 11 carbon atoms and
(iii) a mixture of dibasic acids or anhydrides comprising a mixture of (a) a phthalic acid or anhydride and (b) an acid or anhydride selected from succinic, glutaric or adipic or any mixture thereof.

If desired, the phthalic acid may be isophthalic acid.

The amount of polyester is preferably from 40% to 80% by weight based on the weight of the polymer. The polyester may be obtained by reacting the acid or acid anhydride with a glycol and an alcohol. A deficiency or excess of either or both of the glycol and alcohol may be used: where there is a deficiency of glycol this may be from 0 to 10 mole % below the theoretical amount and where there is a deficiency of alcohol, this may be from 0 to 50 mole % below the theoretical amount: where there is an excess of either or both glycol and alcohol this may be up to 20 mole % in excess of the theoretical amount.

The polyester may also be obtained by ester interchange as, for example, by heating a di-alkyl ester of a di-carboxylic acid with a glycol in the presence of a catalyst.

The molecular weight of the polyester is preferably from 350 to 1000.

The aliphatic dibasic acids or acid anhydrides which are used are succinic, glutaric or adipic or mixtures of these. A mixture of succinic, glutaric and adipic acids which is particularly preferred, is a commercially available mixture having the approximate composition by weight of 21% succinic acid, 45% glutaric acid and 34% adipic acid.

The mixture of the phthalic acid or anhydride and the aliphatic dibasic acid or anhydride may contain up to 80% of the phthalic acid or anhydride but preferably contains from 5 to 50% by weight of the phthalic acid or anhydride. The glycol is preferably a polyethylene glycol with an average molecular weight of from 175 to 225.

The alcohol is preferably one containing from 3 to 6 carbon atoms per molecule, for example, n-butyl alcohol or isobutyl alcohol.

Examples of plasticisers which may be used are those derived from:

(a) 1 mole of phthalic anhydride and 1 mole of a mixture of adipic, glutaric and succinic acids (with the approximate composition by weight 21% succinic, 45% glutaric and 34% adipic acids), 1.88 moles of polyethylene glycol having a molecular weight of 200 and 0.64 moles of isobutanol.
(b) 0.5 moles of phthalic anhydride and 1.5 moles of a mixture of adipic, glutaric and succinic acids (with the approximate composition by weight 21% succinic, 45% glutaric and 34% adipic acids), 1.88 moles of polyethylene glycol having a molecular weight of 200 and 0.64 moles of isobutanol.

The vinyl acetate polymer may be derived from the polymerisation of 100% vinyl acetate monomer or it may be a copolymer derived from the polymerisation of a mixture comprising between 55 and 100% of vinyl acetate, the remainder being one or more ethylenically unsaturated, non-halogenated co-monomers, for example a maleate, an acrylate, a methacrylate or ethylene. The maleates, acrylates and methacrylates may be the alkyl esters for instance the methyl esters. An example of the vinyl acetate polymer is the one sold under the Trade Mark "Vinamul 9800".

The present invention also provides a method for producing a plasticised vinyl acetate polymer or copolymer by adding the plasticiser to an emulsion of the polymer while stirring.

The plasticizer is conveniently added to the emulsion of the polymer and the mixture stirred vigorously using a Silverson homogeniser to obtain a free flowing dispersion.

Vinyl acetate polymers plasticised with the polyesters hereinbefore described may be used in surface coatings, fusible interlinings, adhesives, binders for fibres and non-woven fabrics, sizes for glass fibres, barrier coatings for bitumen-containing floor coverings, linoleum and leather finishes.

Vinyl acetate polymers plasticised in accordance with the present invention are superior to those plasticised with di-n-butyl phthalate which is the commonest plasticiser for polyvinyl acetate. For instance, the volatile loss is significantly less and there is an improvement in the solvent extraction resistance.

The following Examples further illustrate the present invention. Parts by weight shown therein bear the same relation to parts by volume as do kilograms to liters. Parts and percentages are expressed by weight.

EXAMPLE 1

(a) A polyester having a molecular weight of 1200 was prepared from a mixture of 1 mole phthalic anhydride and 1 mole of a mixture of adipic, glutaric and succinic acid (with the approximate composition 21% succinic, 45% glutaric and 34% adipic acids), 1.88 moles of polyethylene glycol having a molecular weight of 200 and 0.64 moles of isobutanol. The acid value was 1.9 mg potassium hydroxide per gram and the hydroxyl value was 20 mg potassium hydroxide per gram. The viscosity was 9,320 centistokes at 25° C.

(b) 33 parts of the polyester prepared in Example 1(a) was added slowly to a mixture of 33 parts water and 100 parts of an emulsion of polyvinyl acetate containing 50 parts of polyvinylacetate. The emulsion was stirred vigorously in a Silverson homogeniser until a free flowing dispersion was obtained, which was cast at a wet film thickness of 0.020 inches onto a clean glass plate. After standing for 24 hours the cast film was assessed visually for clarity and was found to be very good.

Compositions with similarly good clarity are also obtained when the procedure of Example 1(b) is repeated except that instead of polyvinyl acetate the following copolymers are employed. The percentages are by weight:

(a) 90% vinyl acetate-10% ethylene
(b) 80% vinyl acetate-20% ethylene
(c) 60% vinyl acetate-40% dimethylmaleate (d) 55% vinyl acetate-45% methyl acrylate
(e) 75% vinyl acetate-25% methylmethacrylate

EXAMPLE 2

A polyester having a molecular weight of 1125 was prepared from a mixture of 0.5 moles phthalic anhydride and 1.5 moles of a mixture of adipic, glutaric and succinic acid (with the approximate composition 21% succinic, 45% glutaric and 34% adipic acids), 1.88 moles of polyethylene glycol having a molecular weight of 200 and 0.64 moles of isobutanol. The acid value was 13.7 mg potassium hydroxide per gram. The hydroxyl value was 22 mg potassium hydroxide per gram and the viscosity was 4,595 centistokes at 25° C.

This polyester was added to polyvinyl acetate as in Example 1(b) and the clarity was found to be very good.

We claim:

1. A composition comprising a vinyl acetate polymer or copolymer of between 55 and 100% of vinyl acetate with one or more ethylenically unsaturated non-halogenated comonomers and from 10 to 100% by weight based on the weight of the polymer, of a polyester having a molecular weight, of from 350 to 1500 derived from the reaction of
   (i) a polyethylene glycol having a molecular weight up to 500,
   (ii) an aliphatic alcohol containing from 3 to 6 carbon atoms and
   (iii) a mixture of dibasic acids or anhydrides comprising a mixture of
      (a) a phthalic acid or anhydride and
      (b) an acid or anhydride selected from succinic, glutaric or adipic or any mixture thereof;
the dibasic acid or anhydride mixture being reacted with the theoretical amounts of alcohol and glycol needed to effect the reaction with the proviso that the glycol may be reacted with the dibasic acids or anhydrides in amounts ranging from 0–10 mol % below the theoretical amount necessary to effect the reaction to up to 20% in excess of the theoretical amount and the alcohol may be reacted in amounts ranging from 0 to 50 mol % below the theoretical amount to up to 20 mole % in excess of the theoretical amount needed to produce the final product and wherein the dibasic acid or anhydride mixture contains phthalic acid or the anhydride thereof in amounts from 5% to 80% by weight of the mixture.

2. A composition according to claim 1 in which the polyester has a molecular weight from 350 to 1000.

3. A composition according to claim 1 in which the aliphatic dibasic acid from which the polyester is derived is a mixture of succinic, glutaric and adipic acids with the approximate composition by weight of 21% succinic, 45% glutaric and 34% adipic acid.

4. A composition according to claim 1 in which the mixture of dibasic acids or anhydrides contains from 5% to 50% by weight of phthalic acid or anhydride based on the weight of the mixture.

5. A composition according to claim 1 in which the polyethylene glycol has an average molecular weight of from 175 to 225.

6. A composition according to claim 1 in which the alcohol from which the polyester is derived is n-butyl alcohol or iso-butyl alcohol.

7. A composition according to claim 1 in which the polyester is derived from 1 mole of phthalic anhydride and 1 mole of a mixture of adipic, glutaric and succinic acids (with the approximate composition by weight 21% succinic, 45% glutaric and 34% adipic acids), 1.88 moles of polyethylene glycol having a molecular weight of 200 and 0.64 moles of isobutanol.

8. A composition according to claim 1 in which the polyester is derived from 0.5 moles of phthalic anhydride and 1.5 moles of a mixture of adiptic, glutaric and succinic acids (with the approximate composition by weight 21% succinic, 45% glutaric and 34% adipic acids), 1.88 moles of polyethylene glycol having a molecular weight of 200 and 0.64 moles of isobutanol.

9. A composition according to claim 1 in which the amount of polyester is from 40 to 80% by weight based on the weight of vinyl acetate polymer.

* * * * *